(12) United States Patent
Joines et al.

(10) Patent No.: US 7,627,579 B2
(45) Date of Patent: Dec. 1, 2009

(54) MANAGING PORTAL RESPONSE TIMES

(75) Inventors: Stacy R. Joines, Raleigh, NC (US);
Ruthie D. Lyle, Durham, NC (US);
Martin J. Presler-Marshall, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 11/333,018

(22) Filed: Jan. 17, 2006

(65) Prior Publication Data

US 2007/0192701 A1 Aug. 16, 2007

(51) Int. Cl.
*G06F 7/00* (2006.01)

(52) U.S. Cl. .............................. 707/10; 707/1; 709/217; 709/218; 709/219; 715/513; 715/733; 715/742

(58) Field of Classification Search ...................... 707/1, 707/10; 709/217–219; 715/742, 733, 513
See application file for complete search history.

(56) References Cited

U.S. PATENT DOCUMENTS

| | | | |
|---|---|---|---|
| 6,442,529 B1 | 8/2002 | Krishan et al. | |
| 7,269,664 B2 * | 9/2007 | Hutsch et al. | 709/246 |
| 7,281,060 B2 * | 10/2007 | Hofmann et al. | 709/246 |
| 7,313,601 B2 | 12/2007 | Fischer | |
| 2001/0009016 A1 * | 7/2001 | Hofmann et al. | 709/219 |
| 2001/0034771 A1 * | 10/2001 | Hutsch et al. | 709/217 |
| 2002/0129161 A1 | 9/2002 | Lloyd et al. | |
| 2003/0187982 A1 | 10/2003 | Petit | |
| 2003/0188163 A1 * | 10/2003 | Fischer et al. | 713/170 |
| 2004/0133660 A1 | 7/2004 | Junghuber et al. | |
| 2004/0205555 A1 | 10/2004 | Hind et al. | |
| 2005/0223081 A1 * | 10/2005 | McMahan et al. | 709/218 |
| 2006/0031377 A1 * | 2/2006 | Ng et al. | 709/208 |
| 2006/0053376 A1 * | 3/2006 | Ng et al. | 715/742 |
| 2006/0235935 A1 * | 10/2006 | Ng | 709/208 |
| 2006/0242249 A1 * | 10/2006 | Swanson et al. | 709/206 |
| 2006/0242582 A1 * | 10/2006 | Swanson et al. | 715/733 |
| 2007/0038599 A1 * | 2/2007 | Pearson | 707/3 |

OTHER PUBLICATIONS

"Incorporating Cooperative Portlets in Web Application Development"—Nathalic Morento, Jose Raul Romero & Antonio Valecillo—Proceedings 1st Model-Driven Web Engineering Workshop, 2005—Icc.uma.es (pp. 1-10).*

(Continued)

*Primary Examiner*—John E Breene
*Assistant Examiner*—Anh Ly
(74) *Attorney, Agent, or Firm*—Gerald R. Woods, Esq.; Steven M. Greenberg, Esq.; Carey, Rodriguez, Greenberg & Paul, LLP

(57) ABSTRACT

Embodiments of the present invention address deficiencies of the art in respect to portal view rendering and provide a method, system and computer program product for managing portal page response times. In one embodiment, a portal data processing system can include a portlet aggregator coupled to a portal server and configured to aggregate portlets in a portal page and to serve the portal page to a requester over a computer communications network. The system also can include a response time monitor coupled to the portal server and configured to measure response times both for the portal page and the portlets in the portal page. Finally, the system can include a response time remediation processor coupled to the response time monitor and configured to disable underperforming ones of the portlets in the portal page so as to improve the response time for the portal page.

17 Claims, 3 Drawing Sheets

OTHER PUBLICATIONS

Best practices: Developing Portlets Using JSR 168 and WebSphere Portal V5.02—Stefan Hepper & Marshall Lamb—Mar. 3, 1004 IBM Corp. (pp. 1-28).*

Web Services Conceptual Architecture (WSCA 1.0)—Heather Kregar—IBM Software Group May 2001 (p. 1-41).*

"Experience Uisng a Coordination-Based Architecture for Adaptive Web Content Provision" Lindsay Bradford, Stephen Milliner and Marlon Dumas—Springer-Verlag Berlin Heidelberg 2005 (May 3, 2005) (pp. 140-156).*

* cited by examiner

MANAGING PORTAL RESPONSE TIMES

BACKGROUND OF THE INVENTION

1. Field of the Invention

The present invention relates to the field of portal environment management and more particularly to rendering portlet content within a portal view.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

Portals display an aggregation of markup that can, and frequently does, originate from multiple content sources. The performance and availability of any one of these sources can have a profound effect upon the end user experience with a portal, since the entire portal display must be aggregated prior to rendering the portal in a client viewer. Specifically, the various pieces of component markup are provided by the portlets contained on a page, and the slowest portlet acts, in effect, as the weakest link in a chain, by delaying the rendering of the entire display, even when every other portlet has completed construction of its markup.

BRIEF SUMMARY OF THE INVENTION

Embodiments of the present invention address deficiencies of the art in respect to portal view rendering and provide a novel and non-obvious method, system and apparatus for managing portal page response times. In one embodiment, a portal data processing system can include a portlet aggregator coupled to a portal server and configured to aggregate portlets in a portal page and to serve the portal page to a requestor over a computer communications network. The system also can include a response time monitor coupled to the portal server and configured to measure response times both for the portal page and the portlets in the portal page. Finally, the system can include a response time remediation processor coupled to the response time monitor and configured to disable underperforming ones of the portlets in the portal page so as to improve the response time for the portal page.

In one aspect of the embodiment, the system further can include a replacement portlet pool coupled to the response time remediation processor that can include one or more replacement portlets to replace the underperforming ones of the portlets in the portal page. In this regard, the response time remediation processor further can include program code enabled to select one of the replacement portlets in the replacement portlet pool to replace an underperforming one of the portlets in the portal page wherein the selected one of the replacement portlets conforms to a replacement policy for the requestor. In this way, the functionality and content provided by the underperforming portlet need not be completely removed for the portal page.

In another aspect of the embodiment, the response time remediation processor further can include program code enabled to select one of the replacement portlets in the replacement portlet pool to replace an underperforming one of the portlets in the portal page wherein the selected one of the replacement portlets conforms to a replacement policy for the requestor and includes required method actions for triggering actions in dependent ones of the portlets in the portal page. Finally, the response time remediation processor further can include program code enabled to select one of the replacement portlets in the replacement portlet pool to replace an underperforming one of the portlets in the portal page wherein the selected one of the replacement portlets is default compatible with the underperforming one of the portlets in the portal page.

In another embodiment of the invention, a computer implemented method for managing portal page response times in a portal page distribution system can include detecting an underperforming portal page, identifying an underperforming portlet within the portal page, and selectively disabling the underperforming portlet. The method further can include replacing the underperforming portlet with a replacement portlet in lieu of disabling the underperforming portlet. For instance, the method further can include replacing the underperforming portlet with a replacement portlet in lieu of disabling the underperforming portlet if the replacement portlet conforms with a replacement policy for a requestor of the portal page.

In another aspect of the embodiment, the method further can include replacing the underperforming portlet with a replacement portlet in lieu of disabling the underperforming portlet if the replacement portlet conforms with a replacement policy for a requestor of the portal page and if the replacement portlet comprises required method actions for triggering actions in portlets which are dependent upon the underperforming portlet in the portal page. Also, the method further can include replacing the underperforming portlet with a replacement portlet in lieu of disabling the underperforming portlet if the replacement portlet is default compatible with the underperforming portlet. Alternatively, the method can include disabling the underperforming portlet in lieu of replacing the underperforming portlet with the replacement portlet if the replacement portlet is not default compatible with the underperforming portlet.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing portal page response times. In accordance with an embodiment of the present invention, a slow to respond portlet within a portal page can be determined by monitoring the responsiveness of the portal page and by testing the response times of individual portlets in the portal page. When a slow to respond portlet is determined, the slow to respond portlet can be disabled. Alternatively the slow to respond portlet can be replaced with an equivalent portlet or suitable substitute portlet for the slow to respond portlet. In this way, the overall response time for the portal page can be improved.

Figure 1:
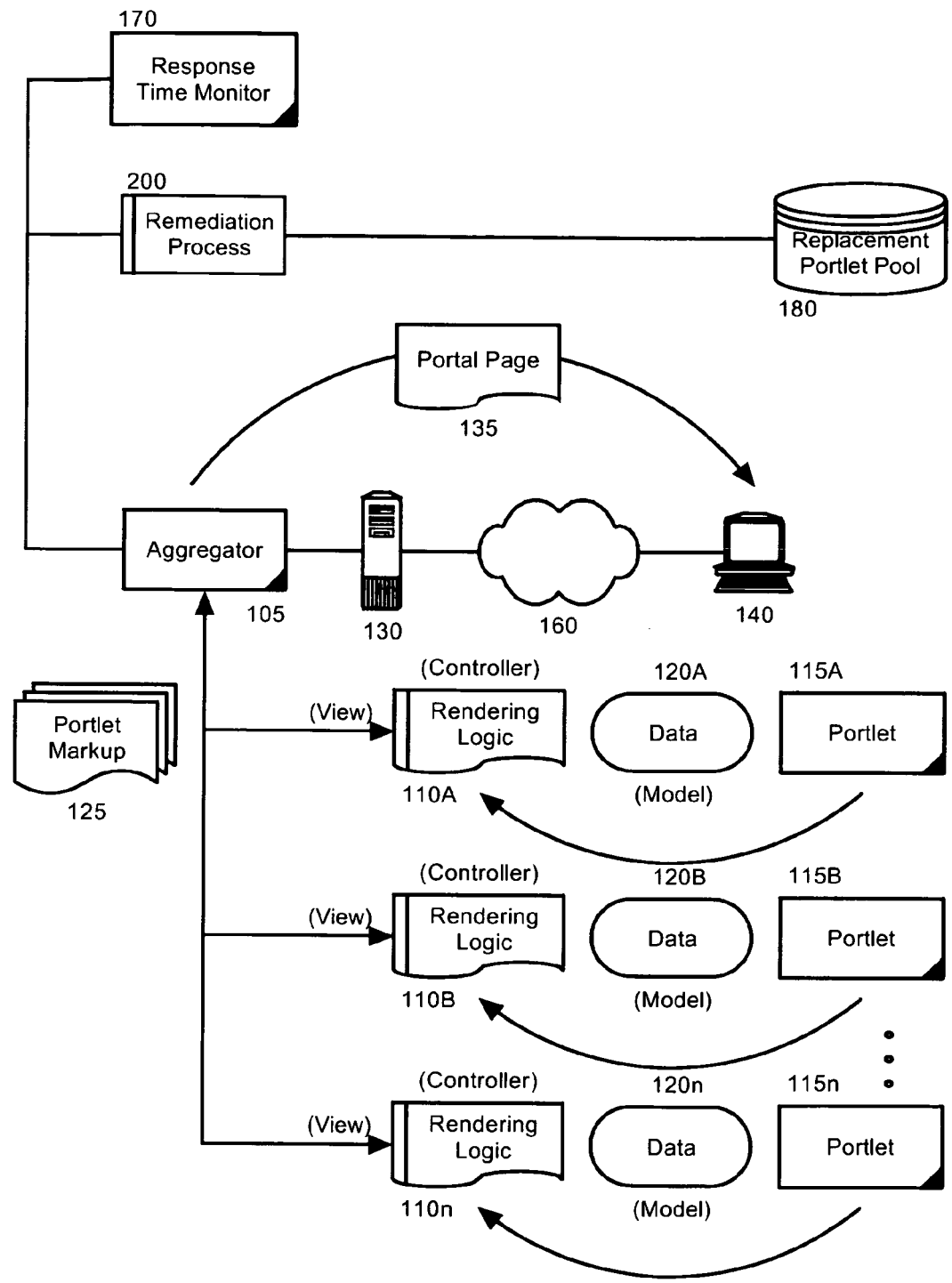
FIG. 1 is a schematic illustration of a portal environment configured to manage portal page response times.

In more particular illustration, FIG. 1 is a schematic illustration of a portal environment configured to manage portal page response times. The portal server system can include a portal page 135 communicatively coupled to a selection of portlet applications 115A, 115B, 115n through a portal server 130. Each portlet application 115A, 115B, 115n can produce a view based upon portlet data 120A, 120B, 120n in the form of portlet markup 125 through corresponding rendering logic 110A, 110B, 110n. Notably, the rendering logic 110A, 110B, 110n can be active markup such as a JSP, in which logical scriptlets can be embedded to produce specific markup language tags.

A portlet aggregator 105 can be coupled to each portlet application 115A, 115B, 115n to receive the portlet markup 125 and to aggregate the portlet markup 125 into view in the portal page 135. By aggregation, it is meant that the individual markup language blocks produced by each portlet 115A, 115B, 115n can be combined into a single cohesive markup language document configured for distribution to and use within a conventional content browser. In this regard, the portal page 135 can be disposed in the portal server 130 from which the portal page 135 can be accessed by client content browsing devices 140 over a computer communications network 160 such as a local computer communications network, for instance a private intranet, or a global computer communications network, for instance the public Internet.

In accordance with an embodiment of the present invention, the portlet aggregator 105 can be coupled both to a response time monitor 170 and a response time remediation processor 200. The response time monitor 170 can measure the responsiveness of the portal page 135 when rendered from an aggregation of the portlet markup 125 produced by the portlet applications 115A, 115B, 115n. In this regard, the responsiveness can include the time taken to aggregate and load the portlet markup 125 from the portlet markup 125 from the different portlet applications 115A, 115B, 115n. The response time monitor 170 further can measure the responsiveness of each individual portlet application 115A, 115B, 115n in producing corresponding portlet markup 125 to be aggregated into the portal page 135.

The response time remediation processor 200 can include program code enabled to disable slow to respond ones of the portlet applications 115A, 115B, 115n whenever a slow to respond portlet application 115A, 115B, 115n can be identified through the monitoring of the response time monitor 170. Alternatively, whenever a slow to respond one of the portlet applications 115A, 115B, 115n is identified, a replacement portlet can be determined for the slow to respond one of the portlet applications 115A, 115B, 115n. The replacement portlet can be determined by searching a coupled replacement portlet pool 180. The replacement portlet can be an equivalent to the slow to respond one of the portlet applications 115A, 115B, 115n, or a suitable substitute for the slow to respond one of the portlet applications 115A, 115B, 115n.

Figure 2:
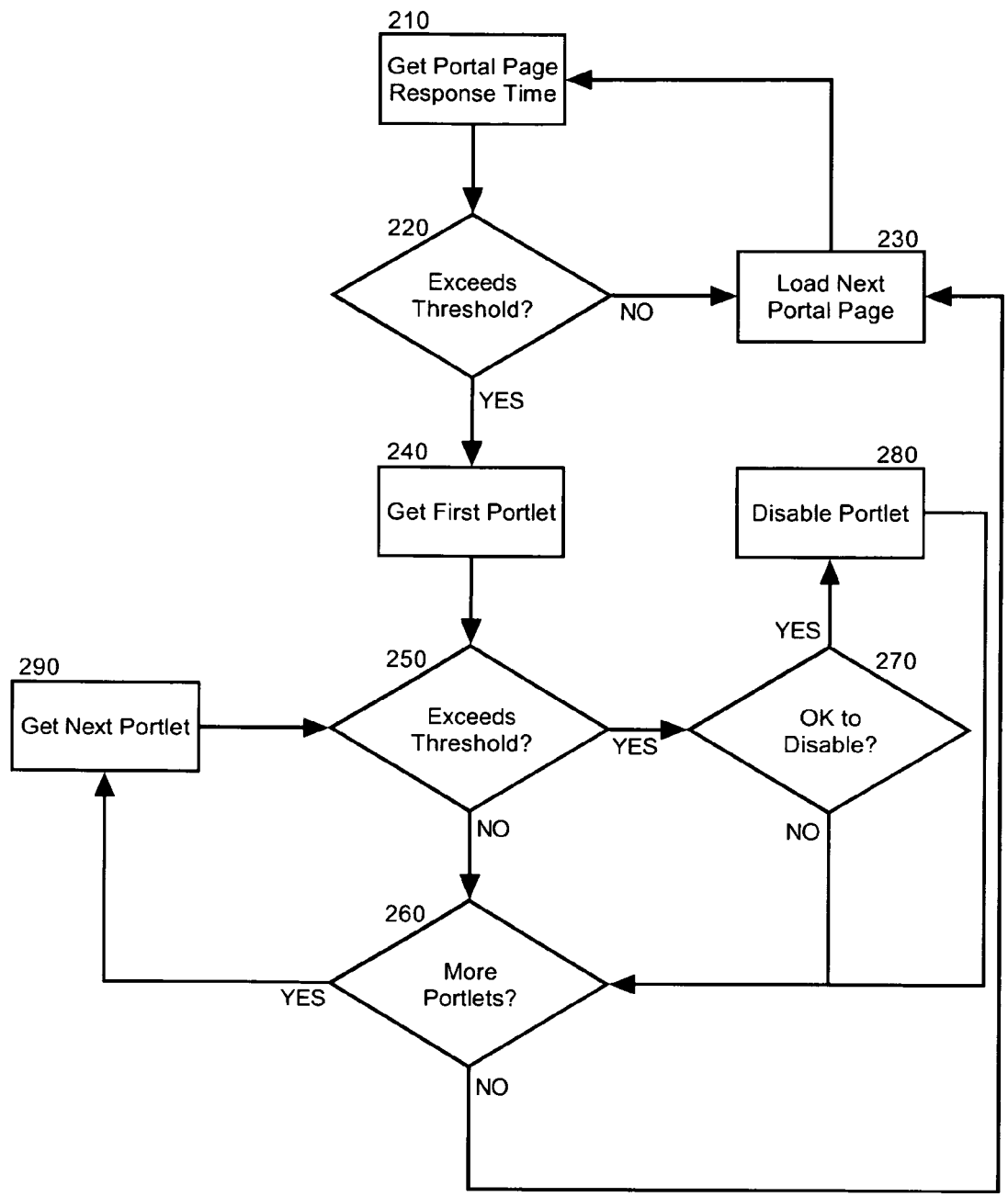
FIG. 2 is a flow chart illustrating a method for disabling slow portlets in a portal page to improve response times in the portal environment of FIG. 1; and, FIG. 3 is a flow chart illustrating a process for replacing slow portlets in a portal page to improve response times in the portal environment of FIG. 1.

In more particular illustration of the operation of the response time remediation processor 200, FIG. 2 is a flow chart illustrating a method for disabling slow portlets in a portal page to improve response times in the portal environment of FIG. 1. Beginning in block 210, the portal page response time measured for rendering a portal page can be obtained and in decision block 220, it can be determined whether the response time exceeds an acceptable threshold. If not, the process can terminate until a next loading of a portal page in block 230. Otherwise, the process can continue through block 240 where the first portlet in the portal page can be selected for analysis.

In decision block 250, it can be determined whether the response time for the selected portlet exceeds an acceptable threshold. If not, it can be presumed that the selected portlet is not responsible for the sub-standard performance of the portal page. Accordingly, in decision block 260, if additional portlets remain to be analyzed in the portal page, in block 290 a next portlet in the portal page can be selected for analysis and the process can repeat through decision block 250. In decision block 250, when the response time for a selected portlet is found to exceed an acceptable threshold, in decision block 270, it can be determined whether it is permitted to disable the selected portlet. If so, in block 280, the selected portlet can be disabled so as to remove the burden of the underperforming portlet from the portal page. Subsequently, the process can repeat for the remaining portlets in the portal page through decision block 260.

Figure 3:
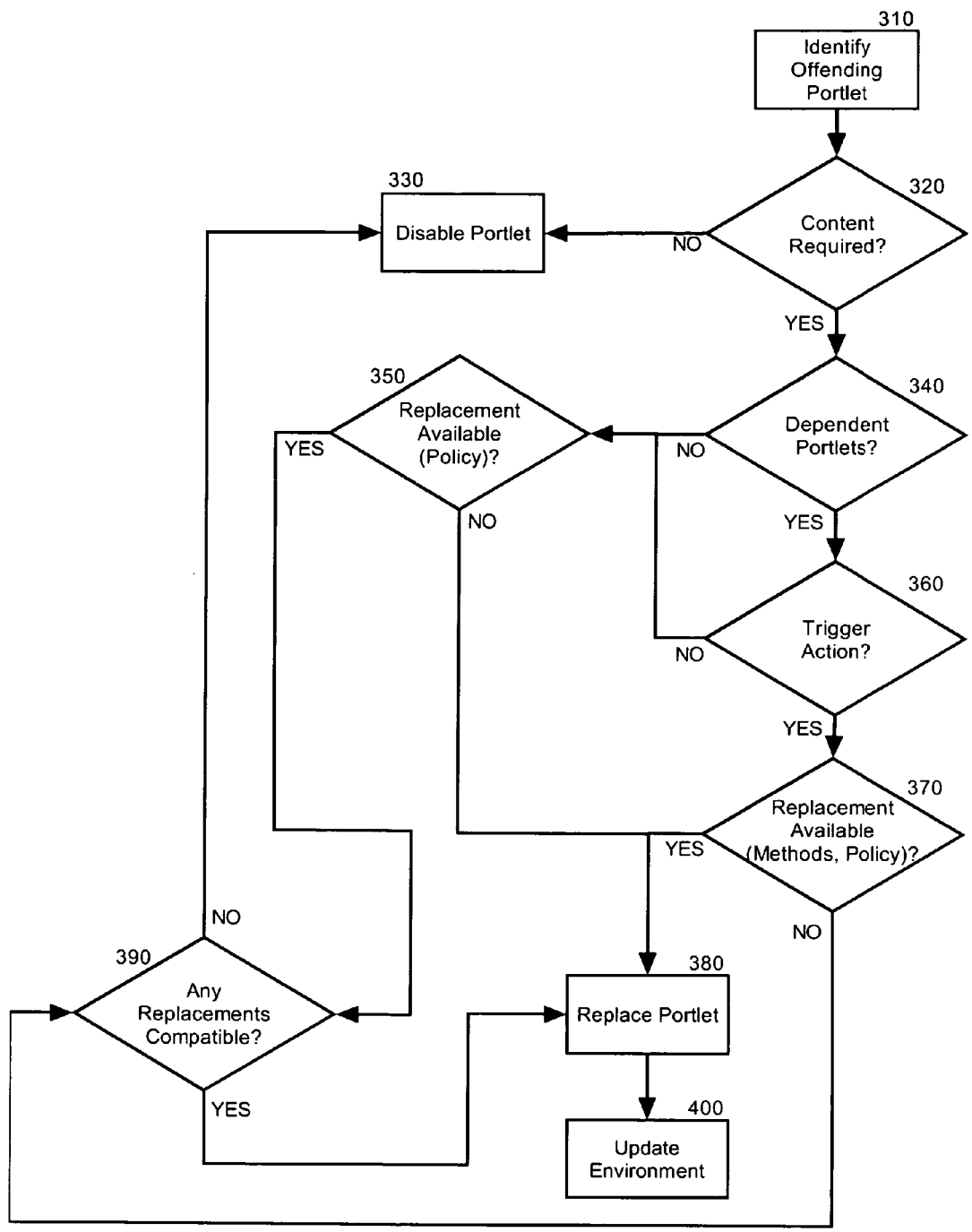

Notably, the disabling of an underperforming portlet in a portal page can result in needed functionality being removed from availability in the portlet. As such, in an alternative embodiment, underperforming portlets in a portal page can be replaced with equivalent or acceptable substitute portlets when available. In the alternative embodiment, only where an equivalent or acceptable substitute portlet cannot be located will an underperforming portlet be disabled. More specifically, FIG. 3 is a flow chart illustrating a process for replacing slow portlets in a portal page to improve response times in the portal environment of FIG. 1.

Referring to block 310, in the alternative embodiment, an underperforming portlet can be selected for processing. For instance, the underperforming portlet can be an operable portlet lacking performance, or the underperforming portlet can be a non-responsive portlet due to a failing backend server supporting the non-responsive portlet. In decision block 320, it can be determined whether the portlet is required for the acceptable operation of the portal page. If not, the portlet can be disabled in block 330. Otherwise, in decision block 340, it further can be determined whether the underperforming portlet communicates with dependent portlets. If not, in decision block 350 it can be determined whether a replacement portlet is available which merely conforms with a replacement policy for the user of the underperforming portlet. If a conforming replacement portlet can be identified, in block 380 the underperforming portlet can be replaced with the conforming replacement portlet and the portal environment can be updated in block 400.

Returning to decision block 340, if it is determined that the underperforming portlet communicates with dependent portlets, it further can be determined in block 360 whether the underperforming portlet triggers actions in the dependent portlets. If not, the process can continue through decision block 350 as before. Otherwise, in decision block 370 it yet further can be determined whether a replacement portlet can be identified which not only conforms with the replacement policy for the user, but also which includes the required method actions for triggering actions in the dependent portlets. If so, the underperforming portlet can be replaced with the replacement portlet in block 380 and the portal environment can be updated in block 400.

In either of decision block 350 and 370, if a replacement portlet cannot be identified which conforms with the replacement policy for the user, in decision block 390, it can be determined whether any replacement portlets in a pool of replacement portlets are default compatible with the underperforming portlet, irrespective of the replacement policy of the user and the configuration of the replacement policy to include the required method actions. If not, the underperforming portlet can be disabled in block 330. Otherwise, in block 380 the underperforming portlet can be replaced with a selected, compatible portlet and in block 400 the environment can be updated.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A portal data processing hardware system comprising:
   a portlet aggregator coupled to a portal server and configured to aggregate portlets in a portal page and to serve the portal page to a requestor over a computer communications network;
   a response time monitor coupled to the portal server and configured to measure response times both for the portal page and the portlets in the portal page;
   a response time remediation processor coupled to the response time monitor and configured to disable underperforming ones of the portlets in the portal page so as to improve the response time for the portal page; and
   wherein the response time remediation processor further comprises program code enabled to select one of the replacement portlets in the replacement portlet pool to replace an underperforming one of the portlets in the portal page wherein the selected one of the replacement portlets conforms to a replacement policy for the requestor and comprises required method actions for triggering actions in dependent ones of the portlets in the portal page.

2. The system of claim 1, further comprising a replacement portlet pool coupled to the response time remediation processor and comprising a plurality of replacement portlets to replace the underperforming ones of the portlets in the portal page.

3. The system of claim 2, wherein the response time remediation processor further comprises program code enabled to select one of the replacement portlets in the replacement portlet pool to replace an underperforming one of the portlets in the portal page wherein the selected one of the replacement portlets conforms to a replacement policy for the requester.

4. The system of claim 2, wherein the response time remediation processor further comprises program code enabled to select one of the replacement portlets in the replacement portlet pool to replace an underperforming one of the portlets in the portal page wherein the selected one of the replacement portlets is default compatible with the underperforming one of the portlets in the portal page.

5. The system of claim 1, wherein the underperforming one of the portlets is a non-responsive portlet.

6. A computer implemented method for managing portal page response times in a portal page distribution system, the method comprising:
   detecting an underperforming portal page;
   identifying an underperforming portlet within the portal page;
   selectively disabling the underperforming portlet; and
   further comprising replacing the underperforming portlet with a replacement portlet in lieu of disabling the underperforming portlet if the replacement portlet conforms with a replacement policy for a requestor of the portal page and if the replacement portlet comprises required method actions for triggering actions in portlets which are dependent upon the underperforming portlet in the portal page.

7. The method of claim 6, further comprising replacing the underperforming portlet with a replacement portlet in lieu of disabling the underperforming portlet.

8. The method of claim 6, further comprising replacing the underperforming portlet with a replacement portlet in lieu of disabling the underperforming portlet if the replacement portlet conforms with a replacement policy for a requestor of the portal page.

9. The method of claim 6, further comprising replacing the underperforming portlet with a replacement portlet in lieu of disabling the underperforming portlet if the replacement portlet is default compatible with the underperforming portlet.

10. The method of claim 9, further comprising disabling the underperforming portlet in lieu of replacing the underperforming portlet with the replacement portlet if the replacement portlet is not default compatible with the underperforming portlet.

11. The method of claim 6, wherein detecting an underperforming portal page, comprises detecting a non-responsive portal page.

12. A computer usable storage medium having computer instructions for managing portal page response times in a portal page distribution system, said computer instructions, which, when executed on a computer system, cause the computer system to perform the steps of:
   detecting an underperforming portal page;
   identifying an underperforming portlet within the portal page; selectively disabling the underperforming portlet; and
   further comprising replacing the underperforming portlet with a replacement portlet in lieu of disabling the underperforming portlet if the replacement portlet conforms with a replacement policy for a requestor of the portal page and if the replacement portlet comprises required method actions for triggering actions in portlets which are dependent upon the underperforming portlet in the portal page.

13. The computer usable medium of claim 12, further comprising replacing the underperforming portlet with a replacement portlet in lieu of disabling the underperforming portlet.

14. The computer usable medium of claim 12, further comprising replacing the underperforming portlet with a replacement portlet in lieu of disabling the underperforming portlet if the replacement portlet conforms with a replacement policy for a requestor of the portal page.

15. The computer usable medium of claim 12, further comprising replacing the underperforming portlet with a replacement portlet in lieu of disabling the underperforming portlet if the replacement portlet is default compatible with the underperforming portlet.

16. The computer usable medium of claim 15, further comprising disabling the underperforming portlet in lieu of replacing the underperforming portlet with the replacement portlet if the replacement portlet is not default compatible with the underperforming portlet.

17. The computer usable medium of claim 12, wherein detecting an underperforming portal page, comprises detecting a non-responsive portal page.

* * * * *